US010917632B2

(12) United States Patent
Zhou (10) Patent No.: US 10,917,632 B2
(45) Date of Patent: Feb. 9, 2021

(54) DISPLAY PANEL AND DRIVING METHOD FOR THE SAME, DISPLAY DEVICE

(71) Applicant: BOE TECHNOLOGY GROUP CO., LTD., Beijing (CN)

(72) Inventor: Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 30 days.

(21) Appl. No.: 15/950,599

(22) Filed: Apr. 11, 2018

(65) Prior Publication Data

US 2019/0058872 A1 Feb. 21, 2019

(30) Foreign Application Priority Data

Aug. 16, 2017 (CN) .......................... 2017 1 0701967

(51) Int. Cl.
*H04N 13/337* (2018.01)
*H04N 13/398* (2018.01)
*H04N 13/385* (2018.01)
*G02B 30/00* (2020.01)

(52) U.S. Cl.
CPC .......... *H04N 13/337* (2018.05); *G02B 30/00* (2020.01); *H04N 13/385* (2018.05); *H04N 13/398* (2018.05); *H04N 2213/001* (2013.01)

(58) Field of Classification Search
CPC . H04N 13/337; H04N 13/31; H04N 2213/001
USPC ......................................................... 348/56
See application file for complete search history.

(56) References Cited

U.S. PATENT DOCUMENTS

| 6,936,960 | B2 * | 8/2005 | Cok | H01L 51/5281 313/110 |
| 8,624,963 | B2 | 1/2014 | Lim | |
| 8,791,988 | B2 | 7/2014 | Chae | |
| 2006/0132400 | A1 * | 6/2006 | Cok | G01J 1/32 345/81 |
| 2006/0187155 | A1 * | 8/2006 | Chang | G09G 3/3208 345/76 |
| 2006/0262262 | A1 * | 11/2006 | Kim | G02F 1/134309 349/139 |
| 2007/0195235 | A1 * | 8/2007 | Chang | G02F 1/133553 349/114 |
| 2008/0036853 | A1 * | 2/2008 | Shestak | H04N 13/32 348/51 |

(Continued)

FOREIGN PATENT DOCUMENTS

| CN | 102279484 A | 12/2011 |
| CN | 102338953 A | 2/2012 |
| CN | 105842925 A | 8/2016 |

OTHER PUBLICATIONS

Chinese Office Action in CN 201710701967.6, dated Oct. 28, 2019.

*Primary Examiner* — Jeremiah C Hallenbeck-Huber
(74) *Attorney, Agent, or Firm* — Collard & Roe, P.C.

(57) ABSTRACT

A display panel and a driving method for the same, and a display device are disclosed. The display panel includes a plurality of display pixels arranged in a first array and black matrixes. Each display pixel includes a first display area; and each black matrix is disposed between two adjacent first display areas. A width of the first display area in a first direction on an array arrangement plane of the first array is smaller than an interval in the first direction between two black matrixes which are adjacent in the first direction.

13 Claims, 3 Drawing Sheets

(56) References Cited

U.S. PATENT DOCUMENTS

| | | | |
|---|---|---|---|
| 2008/0042552 A1* | 2/2008 | Cok | B82Y 20/00 313/501 |
| 2008/0078921 A1* | 4/2008 | Yang | G09G 3/3406 250/205 |
| 2008/0278063 A1* | 11/2008 | Cok | B82Y 20/00 313/500 |
| 2008/0290803 A1* | 11/2008 | Santo | G09G 3/3413 315/151 |
| 2016/0079311 A1* | 3/2016 | Lim | H01L 51/5275 257/40 |
| 2017/0078513 A1* | 3/2017 | Chang | G09G 3/36 |

* cited by examiner

DISPLAY PANEL AND DRIVING METHOD FOR THE SAME, DISPLAY DEVICE

The application claims priority to Chinese patent application No. 201710701967.6, filed on Aug. 16, 2017, the entire disclosure of which is incorporated herein by reference as part of the present application.

TECHNICAL FIELD

Embodiments of the present disclosure relate to a display panel and a driving method for the same, and a display device.

BACKGROUND 3D (three-dimensional) polarized display technology is widely used in current 3D display devices and systems (for example, IMAX) as a mature 3D display technology. A user can feel the depth information based on the received image and generates three-dimensional vision while viewing the 3D polarized display device and wearing polarized glasses.

SUMMARY

At least one embodiment of the present disclosure provides a display panel, and the display panel comprises a plurality of display pixels arranged in a first array and a plurality of black matrixes. Each display pixel comprises a first display area; and each black matrix is disposed between two adjacent first display areas; a width of the first display area in a first direction on an array arrangement plane of the first array is smaller than an interval in the first direction between two black matrixes which are adjacent in the first direction.

For example, in the display panel provided in at least one embodiment of the present disclosure, each display pixel further comprises at least one second display area, and each of the at least one second display area is disposed between the first display area of the display pixel and one of the black matrixes corresponding to the display pixel in the first direction.

For example, the display panel provided in at least one embodiment of the present disclosure further comprises a driving device, luminance of the first display area and luminance of the second display area of each display pixel are controlled independently; and the driving device is configured to allow luminance of all second display areas of the display panel during a display operation to be equal.

For example, in the display panel provided in at least one embodiment of the present disclosure, the driving device is further configured to allow the luminance of all the second display areas to change with time based on average luminance of all first display areas of the display panel during the display operation.

For example, in the display panel provided in at least one embodiment of the present disclosure, all second display areas of the display panel emit white light.

For example, in the display panel provided in at least one embodiment of the present disclosure, a width of each of the at least one second display area in the first direction is equal to about 3%-12% of a width of the display pixel comprising the at least one second display area in the first direction.

For example, the display panel provided in at least one embodiment of the present disclosure further comprises a plurality of first filters arranged in a second array and a plurality of second filters arranged in a third array. The black matrixes are each disposed between two adjacent first filters in the first direction, and a width of each of the first filter in the first direction is not smaller than the interval in the first direction between two black matrixes which are adjacent in the first direction. Each of second filters is disposed between one of the first display areas and one of the black matrixes in the first direction and is overlapped with one of the first filters, and a light transmission spectrum of the second filters does not overlap with a light transmission spectrum of the first filters. Each display pixel comprises one lighting element, and a width of the lighting element in the first direction is larger than the width of the first display area in the first direction and less than or equal to the interval in the first direction between two black matrixes which are adjacent in the first direction.

For example, in the display panel provided in at least one embodiment of the present disclosure, the first filters and the second filters comprise red filters, green filters, or blue filters, and the first filters and the second filters are different in colors.

For example, in the display panel provided in at least one embodiment of the present disclosure, the driving device is further configured to allow first display areas of the display panel to alternately display pixels corresponding to a first image and pixels corresponding to a second image in the first direction, and the first image and the second image are collectively used to achieve three-dimensional display.

For example, in the display panel provided in at least one embodiment of the present disclosure, the driving device is further configured to allow first display areas of the display panel to alternately display pixels corresponding to a first image and pixels corresponding to a second image in the first direction, and the first image and the second image are collectively used to achieve three-dimensional display.

For example, the display panel provided in at least one embodiment of the present disclosure further comprise a phase delay layer; the phase delay layer is disposed on a light-emitting side of the display pixels; the phase delay layer comprises first phase delay units and second phase delay units alternately arranged in the first direction; light phase delay by the first phase delay units differs from light phase delay by the second phase delay units by $(2n-1)\pi$, in which n is a natural number.

For example, the display panel provided in at least one embodiment of the present disclosure further comprises a polarizer; the polarizer is disposed on a light incident side of the phase delay layer.

For example, in the display panel provided in at least one embodiment of the present disclosure, the first direction is a column direction of the display panel.

At least one embodiment of the present disclosure comprises a display device, and the display device comprises the display panel according to any one of the embodiments of the present disclosure.

At least one embodiment of the present disclosure comprises a driving method of a display panel, and the driving method comprises: driving first display areas of the display panel to alternately display pixels corresponding to a first image and pixels corresponding to a second image in the first direction, in which the first image and the second image are collectively used to achieve three-dimensional display.

For example, in the driving method of the display panel provided in at least one embodiment of the present disclosure, each display pixel further comprises at least one second display area, and each of the at least one second display area is disposed between the first display area of the display pixel and the black matrix corresponding to the display pixel in the first direction, and the driving method further comprises: driving second display areas of the display panel to emit white light or to emit no light.

For example, in the driving method of the display panel provided in at least one embodiment of the present disclosure, luminance of the white light emitted by each of the second display areas is changed based on average luminance of the first display areas of the display panel during a display operation.

BRIEF DESCRIPTION OF THE DRAWINGS

In order to clearly illustrate the technical solution of the embodiments of the present disclosure, the drawings of the embodiments will be briefly described in the following, it is obvious that the described drawings are only related to some embodiments of the present disclosure and thus are not limitative of the present disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used in the present disclosure have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Figure 1A:
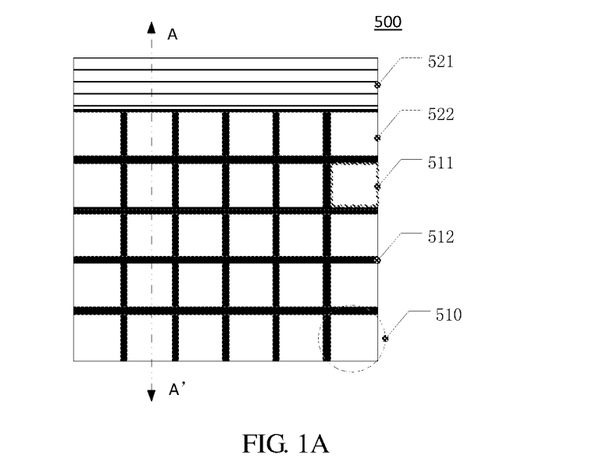
FIG. 1A is a plan view illustrating a display panel.
Figure 1B:
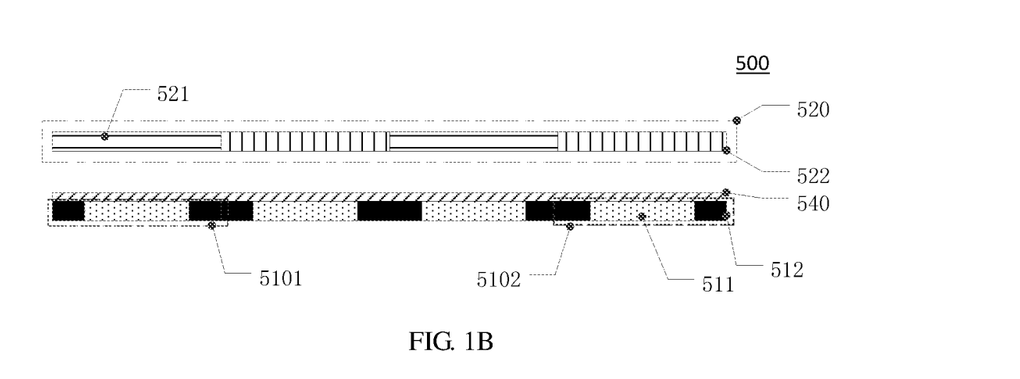
FIG. 1B is a cross-sectional view sectioning along line A-A' of the display panel illustrated in FIG. 1A.

FIG. 1A and FIG. 1B respectively illustrate a plan view and a cross-sectional view of a display panel 500, and the cross-sectional view illustrated in FIG. 1B is sectioning along line A-A' of the display panel 500 illustrated in FIG. 1A. For example, as illustrated in FIG. 1A and FIG. 1B, the display panel 500 can comprise display pixels 510 arranged in an array, black matrixes 512, a phase delay layer 520 and a polarizer (polarization sheet) 540.

For example, each display pixel 510 comprises a first display area 511; and each black matrix 512 can be disposed between two adjacent first display areas 511. For example, the polarizer 540 can be disposed on a light incident side of the phase delay layer 520, and the polarizer 540 can be disposed between the display pixels 510 and the phase delay layer 520, and therefore, light incident on the phase delay layer 520 is linearly polarized light.

For example, a plurality of display pixels 510 arranged in an array can comprise first display pixels 5101 and second display pixels 5102 alternately arranged in a first direction. For example, the first direction can be a column direction illustrated in FIG. 1A. For example, the first display pixels 5101 and the second display pixels 5102 can be respectively configured to display pixels corresponding to a first image and pixels corresponding to a second image, and there is a parallax between the first image and the second image, which can be collectively used to achieve three-dimensional display. For example, the phase delay layer 520 can comprise first phase delay units 521 and second phase delay units 522 alternately arranged in the first direction. For example, the first phase delay unit 521 and the second phase delay unit 522 can respectively correspond to the first display pixel 5101 and the second display pixel 5102.

For example, light phase delay by the first phase delay units 521 differs from light phase delay by the second phase delay units 522 by $(2n-1)\pi$, and n is a natural number. For example, in a case that the phase delay units (the first phase delay units 521 and the second phase delay units 522) allow phase delay of the linearly polarized light to be $(2n-1)\pi$, the phase delay units can allow the polarization direction of the polarized light to rotate 90 degrees. Therefore, in a case that phase delay of the polarized light by the first phase delay units 521 differs from phase delay of the polarized light by the second phase delay units 522 by $(2n-1)\pi$, the polarization direction of light outputted by the first phase delay units 521 and the polarization direction of light outputted by the second phase delay units 522 are perpendicular to each other. For such a case, when the polarization direction of the eyeglass for the left-eye and the polarization direction of the eyeglass for the right-eye of the polarized glasses worn by the user are perpendicular to each other, each eye of the user can only receive light outputted by the first phase delay units 521 (for example, light of the first image) or light outputted by the second phase delay units 522 (for example, light of the second image), and therefore, the user's brain can generate three-dimensional vision based on the first image (for example, left eye image) observed by the left eye and the second image (for example, right eye image) observed by the right eye.

Figure 1C:
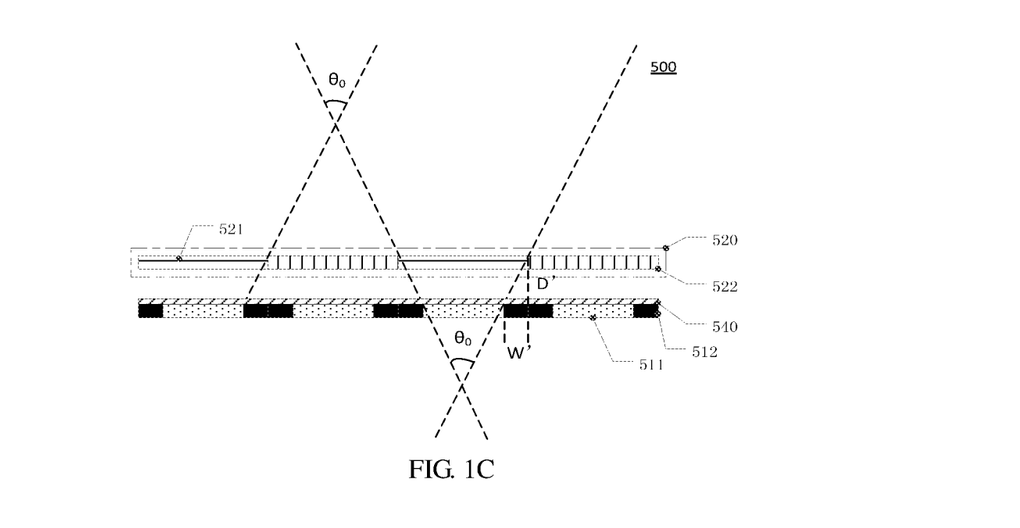
FIG. 1C is a schematic diagram illustrating a view angle of the display panel illustrated in FIG. 1A in a first direction.

For example, as illustrated in FIG. 1C, for light outputted by any one of the display pixels 510 (for example, the first display pixel 5101), when an angle of the outputted light is within a range of $\theta_0$, light can be transmitted through corresponding phase delay unit (for example, the first delay unit 521), and the corresponding phase delay unit can result in a predetermined phase delay to the light (light within the range of $\theta_0$), and therefore, light within the range of $\theta_0$ can enter into a predetermined eye (for example, the left eye) via the polarized glasses worn by the user. For example, when light is out of a range of $\theta_0$, light can be transmitted through the phase delay unit (for example, the second phase delay unit 522) adjacent to the corresponding phase delay unit, however, light phase delay by the phase delay unit adjacent to the corresponding phase delay unit will differ from (2n−1) π compared with the predetermined phase delay value, and light that is out of the range of $\theta_0$ will enter into an eye adjacent to the predetermined eye (for example, the right eye) via the polarized glasses worn by the user. Therefore, when the user is out of the $\theta_0$ range (that is, out of the viewing angle range of the 3D polarized display device), a 3D image with greater crosstalk can be observed by the user; when the user is within the $\theta_0$ range, a more ideal 3D image (theoretically crosstalk-free image) can be observed by the user. For example, in a case that the first phase delay units 521 and the second phase delay units 522 are alternately arranged in the column direction, the viewing angle of the 3D polarized display device means a view angle in the vertical direction of the 3D polarized display device.

The inventor noticed that the viewing angle $\theta_0$ of the 3D polarized display device is equal to 2 arctan (W'/D'), D' is an interval between the phase delay layer 520 (a surface of the phase delay layer 520 away from the display pixel 510) and the display pixels 510 in a direction perpendicular to the phase delay layer 520, W is the width of each black matrix 512 in the first direction.

The inventor also noticed that with the development of display technologies, the width W' of each black matrix 512 in the display panel 500 gradually decreases, therefore, the viewing angle of the 3D polarized display device is gradually reduced, which is contrary to the user's expectation for the 3D display device.

The inventor further noticed that the following two methods can increase the viewing angle $\theta_0$ of the 3D polarized display device, that is, decreasing the interval D' between the phase delay layer 520 and the display pixels 510 by decreasing a thickness of a glass substrate (for example, the glass substrate is disposed between the phase delay layer 520 and the polarizer 540) of the display panel 500, or providing black light-shielding strips on a side of the phase delay layer 520 (for example, a side away from the display pixels 510) for blocking light incident onto it. However, the aforementioned first method can reduce the yield and reliability of the 3D polarized display device; and the aforementioned second method can introduce additional moire pattern.

A display panel and a driving method for the same, and a display device are provided by embodiments of the present disclosure, and a viewing angle of the display panel and the display device is increased.

At least one embodiment of the present disclosure provides a display panel, and the display panel includes a plurality of display pixels arranged in a first array and black matrixes. Each display pixel includes a first display area; and each black matrix is disposed between two adjacent first display areas. A width of the first display area in a first direction on an array arrangement plane of the first array is smaller than an interval in the first direction between two black matrixes which are adjacent in the first direction.

In different embodiments, for example, the first direction can be a column direction of the display panel; for another example, the first direction can also be a row direction of the display panel. For another example, according to actual application requirements, the first direction can also be any directions parallel to the display panel. For example, the present disclosure will describe the embodiments of the present disclosure by taking a case that the first direction is the column direction of the display panel as an example, but the embodiments of the present disclosure are not limited to this.

The display panel and the driving method for the same, and the display device according to the embodiments of the present disclosure are described below with reference to several embodiments.

Figure 2A:
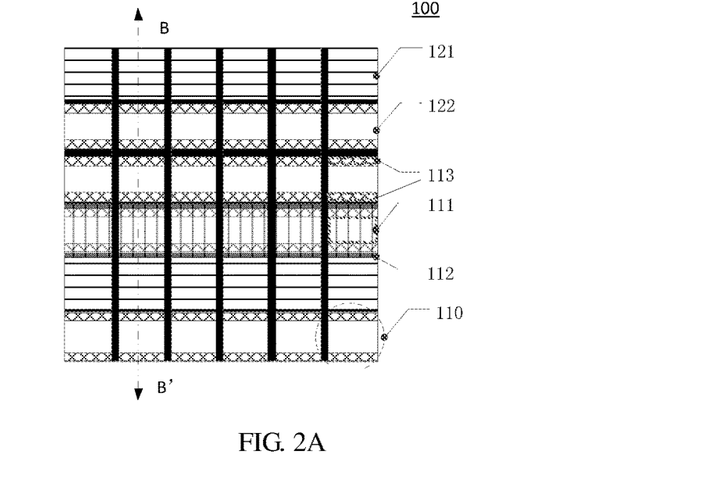
FIG. 2A is a plan view illustrating a display panel according to an embodiment of the present disclosure.
Figure 2B:
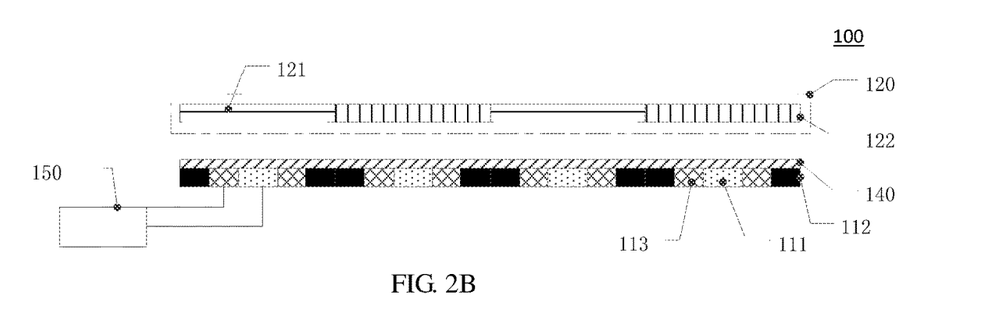
FIG. 2B is a cross-sectional view sectioning along line B-B' of the display panel illustrated in FIG. 2A.

An embodiment of the present disclosure provides a display panel 100, which can be implemented as a liquid crystal display panel or an OLED display panel, but the embodiments of the present disclosure are not limited to this. For example, FIG. 2A and FIG. 2B respectively illustrate a plan view and a cross-sectional view of the display panel 100 provided by an embodiment of the present disclosure, and the cross-sectional view illustrated in FIG. 2B is sectioning along line B-B' of FIG. 2A. For example, the display panel 100 can comprise a plurality of display pixels 110 arranged in a first array, black matrixes 112, a phase delay layer 120 and a polarizer (for example, a polarization sheet) 140.

For example, the polarizer 140 can be disposed on a light incident side of the phase delay layer 120, and the polarizer 140 can be disposed between the array arrangement plane of the display pixels 110 (i.e., an array arrangement plane of the first array) and the phase delay layer 120, and therefore, light incident on the phase delay layer 120 is linearly polarized light. For example, in a case that the display panel 100 is implemented as a liquid crystal display panel, the display panel 100 can further comprise a second polarizer (not shown in FIG. 2B) and a backlight (not shown in FIG. 2B), the backlight can be provided on a side of the array arrangement plane of the display pixels 110 away from the phase delay layer 120, and the second polarizer can be disposed between the backlight and the array arrangement plane of the display pixels 110.

For example, a plurality of display pixels 110 arranged in the first array can comprise first display pixels and second display pixels alternately arranged in a first direction on the array arrangement plane of the display pixels 110. For example, the first direction can be a column direction of the display panel illustrated in FIG. 2A (that is, an extension direction of line BB'), but the embodiments of the present disclosure are not limited to this. For example, the first display pixels and the second display pixels can be respectively configured to display pixels corresponding to a first image and pixels corresponding to a second image, there is a parallax between the first image and the second image (for example, the first image and the second image are slightly different from each other), and thus the first image and the second image can be collectively used to achieve three-dimensional display.

For example, the phase delay layer 120 can comprise first phase delay units 121 and second phase delay units 122 alternately arranged in the first direction. For example, the first phase delay unit 121 and the second phase delay unit 122 can respectively correspond to the first display pixel and the second display pixel. For example, the first phase delay unit 121 and the second phase delay unit 122 can be waveplates which can result in different phase delay, but the embodiments of the present disclosure are not limited to this. For example, the first phase delay unit 121 and the second phase delay unit 122 can be waveplates with same one thickness and fabricated by different materials; for another example, the first phase delay unit 121 and the second phase delay unit 122 can also be waveplates fabricated by same one material but with different thicknesses.

For example, light phase delay by the first phase delay units 121 differs from light phase delay by the second phase delay units 122 by $(2n-1)\pi$, in which n is a natural number. For example, the first phase delay units 121 can result in zero phase delay to the light transmitted through the first phase delay units 121, and the second phase delay units 122 can result in $\pi$ phase delay to the light transmitted through the second phase delay units 122, but the embodiments of the present disclosure are not limited to this. For such a case, compared with the light incident onto the first phase delay units 121, the polarization direction of the light outputted by the first phase delay units 121 is not changed; compared with the light incident onto the second phase delay units 122, the polarization direction of the light outputted by the second phase delay units 122 is rotated by 90 degrees, that is, the polarization direction of the light outputted by the first phase delay units 121 and the polarization direction of the light outputted by the second phase delay units 122 are perpendicular to each other.

For example, each display pixel 110 (the first display pixel or the second display pixel) can comprise a first display area 111; and each black matrix 112 can be disposed between two adjacent first display areas 111. For example, each display pixel 110 can comprise two columns of black matrixes 112, and the above mentioned two columns of black matrixes 112 can be respectively disposed on a left side of the first display area 111 and a right side of the first display area 111; for such a case, two columns of black matrixes 112 are disposed between two adjacent first display areas 111; for example, the two columns of black matrixes 112 disposed between two adjacent first display areas 111 can be in direct contact with each other, or in one example, the two columns of black matrixes 112 disposed between two adjacent first display areas 111 can be formed in same one patterning process with no interface is disposed between the two columns of black matrixes 112. For example, the width of each column of the black matrixes 112 in the first direction can be set according to actual application requirements, which is not limited in this embodiment of the present disclosure. For example, the embodiment of the present disclosure is detailedly described below by taking a case that widths of the columns of the black matrixes 112 are same (all of the widths of the columns of the black matrixes 112 are equal to $W_2$) as an example, but the embodiments of the present disclosure are not limited to this.

For example, a width $W_0$ of each first display area 111 in the first direction can be set according to actual application requirements, for example, the width $W_0$ of each first display area 111 in the first direction can be equal to about 85%-97% of a width W of the display pixel 110 corresponding to the first display area 111 (i.e., the display pixel 110 including the first display area 111) in the first direction, but the embodiments of the present disclosure are not limited to this. For example, an interval between adjacent first display area 111 and black matrix 112 in the first direction can be $W_1$, in which $W_1$ is not equal to zero.

Figure 2C:
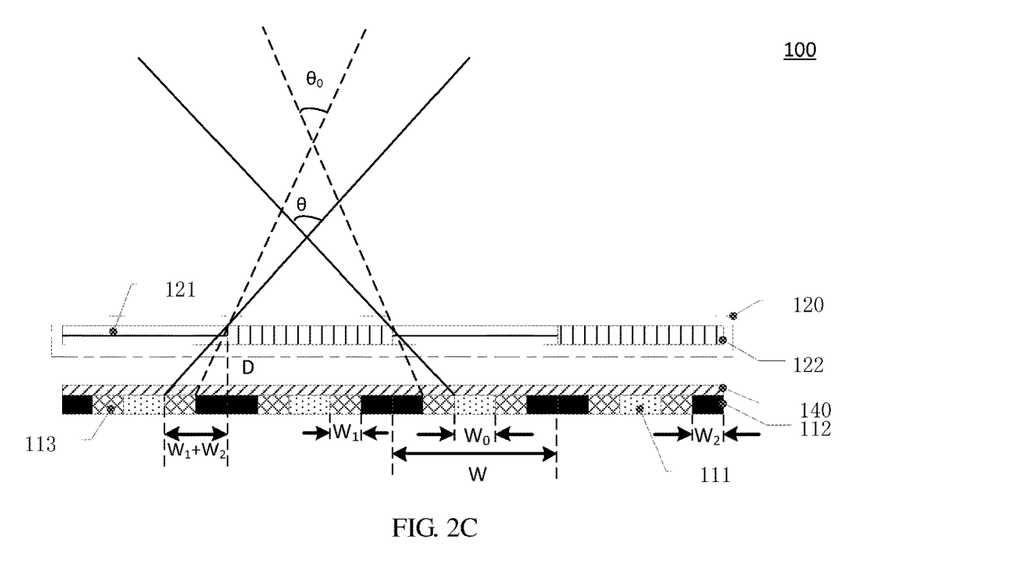
FIG. 2C is a schematic diagram illustrating a view angle of the display panel illustrated in FIG. 2A in a first direction.

For example, the width of the first display area 111 in the first direction is smaller than the interval between two adjacent black matrixes 112 in the first direction, that is, $W_0 < W - 2W_2$; for such a case, as illustrated in FIG. 2C, the viewing angle θ in the first direction of the display panel 100 provided by the embodiment of the present disclosure is θ=2 arctan ((W1+W2)/D), that is, the user can theoretically view a crosstalk-free 3D image when the user is within an range of the viewing angle θ; therefore, compared with the display panel 500 illustrated in FIG. 1C, the viewing angle in the first direction of the display panel 100 illustrated in FIG. 2C is increased. For example, because no light-shielding strips are provided on one side of the phase delay layer 120, no additional moire pattern is introduced while the viewing angle is increased.

For example, each display pixel 110 can further comprise at least one second display area 113; for example, each second display area 113 can be disposed between the first display area 111 and the black matrix 112, which are adjacent in the first direction (for example, disposed between one of the first display area 111 of the display pixel 110 and one of the black matrixes 112 corresponding to the display pixel 110 in the first direction). For example, the number of the second display areas 113 included in each display pixel 110 can be set according to actual application requirements, which is not specifically limited in this embodiment of the present disclosure. For example, the embodiment of the present disclosure is detailedly described below by taking a case that each display pixel 110 includes two second display areas 113 as an example, but the embodiments of the present disclosure are not limited to this.

For example, a width of each second display area 113 in the first direction can be set according to actual application requirements, which is not limited in this embodiment of the present disclosure. For example, the width of the second display area 113 in the first direction can be equal to the interval W1 in the first direction between the first display area 111 and the black matrix 112, which are adjacent in the first direction, but the embodiments of the present disclosure are not limited to this. For example, the width of the second display area 113 in the first direction can be about 3%-12% (e.g., about 5% or 10%) of the width of the display pixel 110 which comprises the second display area 113, in the first direction, but the embodiments of the present disclosure are not limited to this. For example, the widths of the second display areas 113 in the first direction can be same; for another example, the widths of the second display areas 113 in the first direction can have more than one value according to actual application requirements. For example, the embodiment of the present disclosure is detailedly described below by taking a case that all of the widths of the second display areas 113 in the first direction are set to be W1 as an example, but the embodiments of the present disclosure are not limited to this.

For example, one lighting element (not illustrated in FIG. 2A to FIG. 2C) can be disposed in each first display area 111. For example, one second light unit (not illustrated in FIG. 2A to FIG. 2C) or no light unit is disposed in each second display area 113 according to actual application requirements. For example, a width of the lighting element in the first direction can be equal to the width of the first display area 111 in the first direction, but the embodiments of the present disclosure are not limited to this; for another example, the width of the lighting element in the first direction can also be smaller than the width of the first display area 111 in the first direction, for such a case, because a width of the image display area of the display pixel 110 in the first direction is further reduced, correspondingly, the viewing angle of the display panel 100 is further increased. For example, in a case that one second light unit is disposed in each second display area 113, the width of the second light unit in the first direction can be equal to the width of the second display area 113 in the first direction, but the embodiments of the present disclosure are not limited to this, and for another example, the width of the second light unit in the first direction can also be smaller than the width of the second display area 113 in the first direction.

For example, luminance of the lighting element and luminance of the second light unit can be controlled independently, that is, luminance of the first display areas 111 and luminance of the second display areas 113 can be controlled independently. For example, the display panel 100 can further comprise a driving device 150 such as a driving circuit manufactured on the display panel or a driving chip disposed on the display panel.

For example, the driving device 150 can drive the first display areas 111 of the display panel 100 to alternately display the first image and the second image (for example, to alternately display pixels corresponding to the first image and pixels corresponding to the second image along the first direction) in the first direction. For example, the driving device 150 can be configured for driving the first display areas 111 of the first display pixels to display pixels corresponding to the first image and driving the first display areas 111 of the second display pixels to display pixels corresponding to the second image, this allows users to view 3D image through the glasses for viewing 3D image (for example, polarized glasses).

For example, the driving device 150 can also drive the second display areas 113 (the second light units) of the display panel 100 to emit light or to emit no light. For example, in a case that the driving device 150 drives the second display areas 113 of the display panel 100 to emit light, the driving device 150 can be configured to allow luminance of all the second display areas 113 of the display panel 100 during a display operation to be equal, which increases luminance of the display panel 100 while increasing the viewing angle of the display panel 100 in the first direction. It should be noted that, the luminance of all the second display areas 113 being equal means that the maximum value of luminance difference between different second display areas 113 is within a certain numerical range. For example, it can be considered that the luminance of all the second display areas 113 is equal in a case that the maximum value of the luminance difference between different second display areas 113 is less than about 5% of the average luminance value of the second display areas 113.

For example, color of the light outputted by the second display areas 113 can be set based on color of the light outputted by the first display areas 111. For example, when the colors of the light outputted by the first display areas 111 are three primary colors, the light outputted by the second display areas 113 can be white light; for another example, when the color of the light outputted by the first display areas 111 is red, the light outputted by the second display areas 113 can be red light.

For example, the luminance of the second display areas 113 can be set according to actual application requirements. For example, the luminance of the second display areas 113 can be a fixed value (for example, any one of 2%-10% of the maximum luminance that each first display area 111 can output). For another example, the luminance of the second display areas 113 (for example, the luminance of all the second display areas 113) can also be changed with time based on average luminance of the first display areas 111 (for example, based on average luminance of all first display areas 111) of the display panel 100 during the display operation; this avoids the luminance of the second display areas 113 being too strong or too weak.

For example, the viewing angle of the display panel in the first direction (for example, the vertical direction) is increased by allowing the width of the first display area in the first direction to be smaller than the interval in the first direction between two black matrixes which are adjacent in the first direction.

Another embodiment of the present disclosure provides a display panel 100, which can be implemented as a liquid crystal display panel or an OLED display panel. For example, FIG. 3A and FIG. 3B respectively illustrate cross-sectional views of two display panels provided by the embodiment of the present disclosure. For example, for the sake of clarity, this embodiment only illustrates the content which is different from the foregoing embodiment in FIG. 2A to FIG. 2C, and details that are similar to the foregoing embodiment are not described again.

Figure 3A:
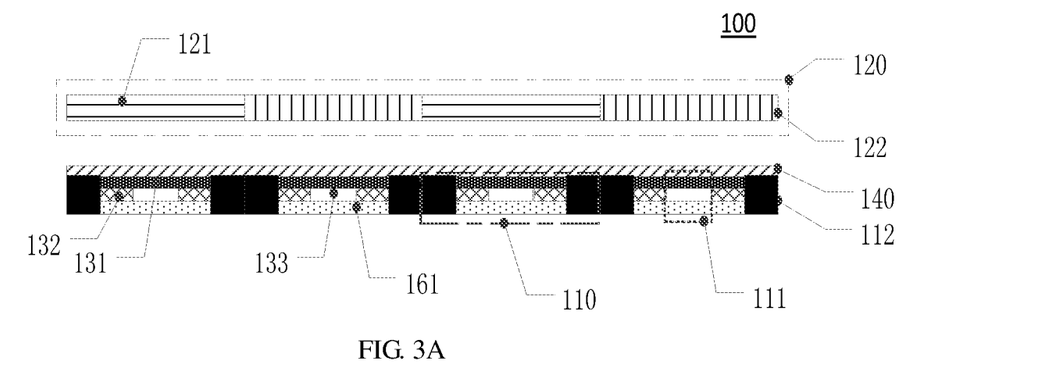
FIG. 3A is a cross-sectional view illustrating a display panel according to another embodiment of the present disclosure.
Figure 3B:
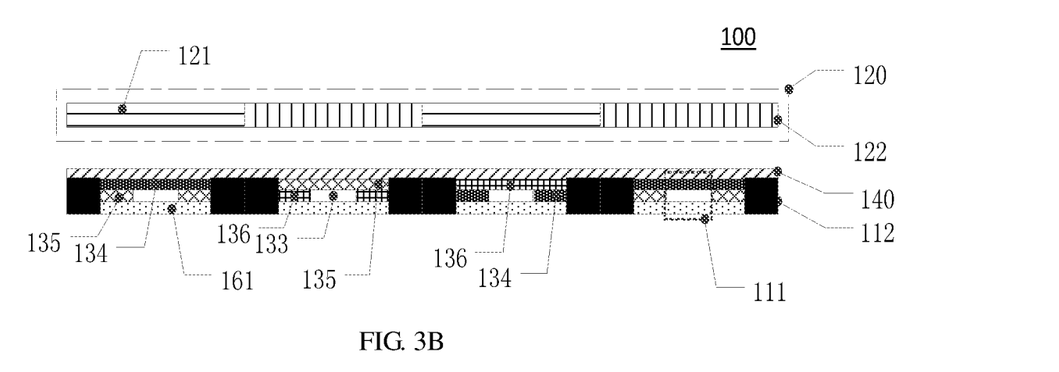
FIG. 3B is a cross-sectional view illustrating another display panel according to another embodiment of the present disclosure.

For example, compared with the display panel provided by the foregoing embodiment in FIG. 2A to FIG. 2C, the display panel 100 provided in this embodiment further comprises a plurality of first filters 131 arranged in a second array and a plurality of second filters 132 arranged in a third array. For example, the first filters 131 and the second filters 132 can be disposed between the array arrangement plane of the display pixels 110 and the phase delay layer 120.

For example, each display pixel 110 can comprise one lighting element 161, a width of the lighting element 161 in the first direction is larger than the width of the first display area 111 in the first direction and less than or equal to the interval between two black matrixes 112 which are adjacent in the first direction. For example, as illustrated in FIG. 3A and FIG. 3B, the width of the lighting element 161 in the first direction is equal to the interval in the first direction between two black matrixes 112 which are adjacent in the first direction, but the embodiments of the present disclosure are not limited to this.

For example, the black matrix 112 is disposed between two adjacent first filters 131 in the first direction, and the width of each first filter 131 in the first direction is not less than the interval in the first direction between two black matrixes which are adjacent in the first direction. For example, as illustrated in FIG. 3A and FIG. 3B, the width of each first filter 131 in the first direction can be equal to the interval in the first direction between two black matrixes 112 which are adjacent in the first direction, but the embodiments of the present disclosure are not limited to this.

For example, each second filter 132 can be disposed between the first display area 111 and the black matrix 112, which are adjacent in the first direction (for example, disposed between one of the first display areas 111 and one of the black matrixes 112 in the first direction), and each second filter 132 can be overlapped with one of the first filters 131. For example, the second filters 132 can be disposed on both sides of the first display area 111, and the second filters 132 is closer to the phase delay layer 120 compare to the lighting element 161; for example, each second filter 132 can be in direct contact with adjacent black matrix in the first direction. For example, a light transmission spectrum of the second filters 132 does not overlap with a light transmission spectrum of the first filters 131, that is, the light (or spectrum of the light) transmitted through the second filters 132 can be blocked (e.g., absorbed) by the first filters 131, the light (or spectrum of the light) transmitted through the first filters 131 can be blocked by the second filters 132. Therefore, light outputted by a region, which is corresponding to the first display areas 111, of the lighting element 161 can be incident onto the polarizer 140 and the phase delay layer 120 after transmitted through the first filters 131; and light outputted by a region, which is corresponding to the second filter 132, of the lighting element 161 can be blocked by the first filters 131 and the second filters 132 which are overlapped with each other and thus cannot be incident onto the polarizer 140 and the phase delay layer 120; this reduces the width of the image display area of the display pixel in the first direction (for example, the width of the portion of the lighting element 161 corresponding to the first display area 111 in the first direction), and thus the viewing angle of the display panel 100 provided in the embodiment illustrated in FIG. 3A in the first direction is increased.

For example, the first filters 131 and the second filters 132 can comprise red filters 134, green filters 135, or blue filters 136, and colors of the first filters 131 and the second filters 132 are different (that is, the first filters 131 and the second filters 132 are different in colors), but the embodiments of the present disclosure are not limited to this. For example, as illustrated in FIG. 3B, the first filter and the second filter in the leftmost display pixel 110 can respectively be the red filter 134 and the green filter 135; and the first filter and the second filter in the second display pixel from left to right can respectively be the green filter 135 and the blue filter 136; and the first filter and the second filter in the third display pixel 110 from left to right can respectively be the blue filter 136 and the red filter 134, but the embodiments of the present disclosure are not limited to this.

For example, the positions of the first filters 131 and the second filters 132 relative to the phase delay layer 120 can be set according to actual application requirements. For example, as illustrated in FIG. 3B, compared with the second filters 132, the first filters 131 can be closer to the phase delay layer 120, but the embodiments of the present disclosure are not limited to this. For another example, compared with the second filters 132, the first filters 131 can be further away from the phase delay layer 120. For example, the display panel provided in this embodiment can further comprise a planarization layer unit 133 for providing the first filters 131 with a flat surface. For example, the planarization layer unit 133 can be disposed between two second filters 132 of the display pixel 110 including the planarization layer unit 133, but the embodiments of the present disclosure are not limited to this. For example, the planarization layer unit 133 can be silicon oxide (SiOx), silicon oxynitride (SiNxOy), silicon nitride (SiNx), transparent resin, or other suitable materials.

For example, by providing the first filters 131 and the second filters 132 which are overlapped with each other, the width of the display area of the display pixel 110 in the first direction is smaller than the interval in the first direction between two black matrixes 112 which are adjacent in the first direction, this increases the viewing angle of the display panel 100 in the first direction (for example, the vertical direction).

Figure 4:
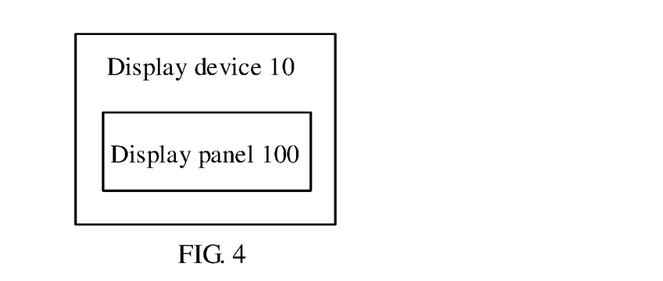
FIG. 4 is an exemplary block diagram illustrating a display device according to further another embodiment of the present disclosure.

Further another embodiment of the present disclosure provides a display device. For example, as illustrated in FIG. 4, the display device 10 can comprise the display panel 100, and the display panel 100 can be any one of the display panels provided in any one of the above embodiments. It should be noted that, all other components (such as a control device, an image data encoding/decoding device, a clock circuit, or the like) that are essential to the display device 10 can use existing components/devices, which are not described herein again, and should not be constructed as a limitation on the present disclosure.

For example, the display device 10 can be any products or components with display function such as a cell phone, a tablet computer, a television, a display, a notebook computer, a digital photo frame, a navigator or the like. The display device increases the viewing angle in the first direction.

Figure 5:
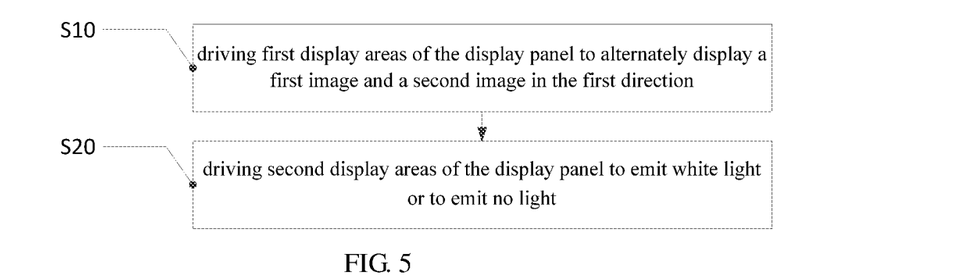
FIG. 5 is an exemplary flowchart of a driving method of a display panel according to still another embodiment of the present disclosure.

For example, still another embodiment of the present disclosure provides a driving method of a display panel, and the driving method can applied on any one of the display panels provided in any one of the above embodiments. For example, taking the case of the embodiment illustrated in FIG. 2A and FIG. 2B as an example, as illustrated in FIG. 5, the driving method can comprise the following step S10.

Step S10: driving first display areas of the display panel to alternately display a first image and a second image (for example, to alternately display pixels corresponding to the first image and pixels corresponding to the second image) in the first direction, in which the first image and the second image are collectively used to achieve three-dimensional display.

For another example, according to actual application requirements, the driving method can further comprise the following step S20.

Step S20: driving second display areas of the display panel to emit white light or to emit no light.

For example, when the second display areas of the display panel is driven to emit white light, the luminance of the white light emitted by each of the second display areas can be changed based on average luminance of the first display areas of the display panel during a display operation, this avoids the luminance of the second display areas being too strong or too weak compared with the luminance of the first display areas.

For example, the structure of the display panel and the driving method of the display panel can be referred to the aforementioned embodiments, and repeated details are not described herein again. For example, the driving method of the display panel provided in this embodiment increases the viewing angle of the display panel in the first direction by driving the second display areas of the display panel to emit white light or to emit no light.

A display panel and a driving method for the same, and a display device are provided by embodiments of the present disclosure, and a viewing angle of the display panel and the display device is increased, especially when displaying 3D images.

What are described above is related to the illustrative embodiments of the disclosure only and not limitative to the scope of the disclosure; the scopes of the disclosure are defined by the accompanying claims.

What is claimed is:

1. A display panel comprising:
   a plurality of display pixels arranged in a first array, wherein each display pixel comprises a first display area; and
   black matrixes, each disposed between two adjacent first display areas;
   a phase delay layer disposed on a light-emitting side of the display pixels,
   wherein a width of the first display area in a first direction on an array arrangement plane of the first array is smaller than an interval in the first direction between two black matrixes which are adjacent in the first direction;

the phase delay layer comprises first phase delay units and second phase delay units alternately arranged in the first direction;

a width of each first display area in the first direction is equal to about 85%-97% of a width of a display pixel including the each first display area in the first direction;

the each display pixel further comprises one first display area and two second display area;

the two second display area are respectively disposed on two sides of the first display area in the first direction;

each of the two second display area is between the first display area of the display pixel and one of the black matrixes corresponding to the display pixel in the first direction;

widths of the two second display area in the first direction are same; and the interval in the first direction between two black matrixes which are adjacent in the first direction is equal to a sum of a width of the one first display area in the first direction and the widths of the two second display area in the first direction.

2. The display panel according to claim 1, wherein the each display pixel further comprises at least one second display area, and each of the at least one second display area is disposed between the first display area of the display pixel and one of the black matrixes corresponding to the display pixel in the first direction.

3. The display panel according to claim 2, further comprising a driving device, wherein luminance of the first display area and luminance of the second display area of the each display pixel are controlled independently; and the driving device is configured to allow luminance of all second display areas of the display panel during a display operation to be equal.

4. The display panel according to claim 3, wherein the driving device is further configured to allow the luminance of all the second display areas to change with time based on average luminance of all first display areas of the display panel during the display operation.

5. The display panel according to claim 2, wherein all second display areas of the display panel emit white light.

6. The display panel according to claim 2, wherein a width of each of the at least one second display area in the first direction is equal to about 3%-12% of a width of the display pixel comprising the at least one second display area in the first direction.

7. The display panel according to claim 3, wherein the driving device is further configured to allow first display areas of the display panel to alternately display pixels corresponding to a first image and pixels corresponding to a second image in the first direction, and the first image and the second image are collectively used to achieve three-dimensional display.

8. The display panel according to claim 1, wherein light phase delay by the first phase delay units differs from light phase delay by the second phase delay units by $(2n-1)\pi$, wherein n is a natural number; and the first direction is a column direction of the display panel.

9. The display panel according to claim 1, further comprising a polarizer, wherein the polarizer is disposed on a light incident side of the phase delay layer; and the polarizer is between the phase delay layer and the black matrixes.

10. A display device comprising the display panel according to claim 1.

11. A driving method of the display panel according to claim 1, comprising:

driving first display areas of the display panel to alternately display pixels corresponding to a first image and pixels corresponding to a second image in the first direction, wherein the first image and the second image are collectively used to achieve three-dimensional display.

12. The driving method according to claim 11, wherein the each display pixel further comprises at least one second display area, and each of the least one second display area is disposed between the first display area of the display pixel and the black matrix corresponding to the display pixel in the first direction, and the driving method further comprises:

driving second display areas of the display panel to emit white light or to emit no light.

13. The driving method according to claim 12, wherein luminance of the white light emitted by each of the second display areas is changed based on average luminance of the first display areas of the display panel during a display operation.

* * * * *